United States Patent
Barnier et al.

(10) Patent No.: US 9,800,571 B2
(45) Date of Patent: *Oct. 24, 2017

(54) WEB BASED EXTRANET ARCHITECTURE PROVIDING APPLICATIONS TO NON-RELATED SUBSCRIBERS

(71) Applicant: Rakuten, Inc., Tokyo (JP)

(72) Inventors: Brian Glen Barnier, Naperville, IL (US); Randy S. Mueller, LaGrange, IL (US); Thomas Terence Dean, Farmington Hills, MI (US); Richard T. Madrid, Tampa, FL (US)

(73) Assignee: RAKUTEN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,011

(22) Filed: Mar. 17, 2016

(65) Prior Publication Data

US 2016/0197908 A1 Jul. 7, 2016

Related U.S. Application Data

(63) Continuation of application No. 14/049,361, filed on Oct. 9, 2013, now Pat. No. 9,323,913, which is a continuation of application No. 13/294,484, filed on Nov. 11, 2011, now Pat. No. 8,566,398, which is a continuation of application No. 10/744,961, filed on Dec. 23, 2003, now Pat. No. 8,082,300, which is a continuation of application No. 10/246,430, filed on Sep. 17, 2002, now Pat. No. 6,697,861, which is a continuation of application No. 09/187,556, filed on Nov. 6, 1998, now Pat. No. 6,453,348.

(51) Int. Cl.
| | | |
|---|---|---|
| G06F 15/16 | (2006.01) | |
| H04L 29/06 | (2006.01) | |
| H04L 29/08 | (2006.01) | |
| G06F 21/33 | (2013.01) | |
| G06F 3/0481 | (2013.01) | |
| G06F 3/0484 | (2013.01) | |

(52) U.S. Cl.
CPC ........ *H04L 63/083* (2013.01); *G06F 3/04817* (2013.01); *G06F 3/04842* (2013.01); *G06F 21/33* (2013.01); *H04L 29/06* (2013.01); *H04L 63/0272* (2013.01); *H04L 63/04* (2013.01); *H04L 63/0428* (2013.01); *H04L 63/10* (2013.01); *H04L 67/02* (2013.01); *H04L 67/10* (2013.01); *H04L 67/306* (2013.01); *H04L 63/08* (2013.01); *H04L 63/0823* (2013.01); *H04L 63/0838* (2013.01)

(58) Field of Classification Search
None
See application file for complete search history.

(56) References Cited

U.S. PATENT DOCUMENTS

| | | |
|---|---|---|
| 5,051,822 A | 9/1991 | Rhoades |
| 5,329,619 A | 7/1994 | Page et al. |
| 5,586,312 A | 12/1996 | Johnson |
| 5,675,802 A | 10/1997 | Allen |
| 5,721,913 A | 2/1998 | Ackroff |
| 5,754,782 A | 5/1998 | Masada |
| 5,757,925 A | 5/1998 | Faybishenko |
| 5,771,354 A | 6/1998 | Crawford |
| 5,774,667 A | 6/1998 | Garvey et al. |
| 5,779,549 A | 7/1998 | Walker |
| 5,790,127 A | 8/1998 | Anderson |
| 5,813,007 A | 9/1998 | Nielsen |
| 5,832,511 A | 11/1998 | Beck |
| 5,835,911 A | 11/1998 | Nakagawa et al. |
| 5,845,090 A | 12/1998 | Collins |
| 5,852,809 A | 12/1998 | Abel |
| 5,862,325 A | 1/1999 | Reed |
| 5,862,346 A | 1/1999 | Kley |
| 5,884,035 A | 3/1999 | Butman et al. |
| 5,925,127 A | 7/1999 | Ahmad |
| 5,946,464 A | 8/1999 | Kito |
| 5,963,207 A | 10/1999 | Brewer |
| 5,970,475 A | 10/1999 | Barnes |
| 6,014,651 A | 1/2000 | Crawford |
| 6,015,344 A | 1/2000 | Kelly |
| 6,032,118 A | 2/2000 | Tello |
| 6,035,423 A | 3/2000 | Hodges |
| 6,061,796 A | 5/2000 | Chen |
| 6,076,105 A | 6/2000 | Wolff |
| 6,088,796 A | 7/2000 | Cianfrocca |
| 6,098,054 A | 8/2000 | McCollom |
| 6,115,040 A | 9/2000 | Bladow |
| 6,119,149 A | 9/2000 | Notani |
| 6,131,120 A | 10/2000 | Reid |
| 6,167,433 A | 12/2000 | Maples |

(Continued)

OTHER PUBLICATIONS

"Ameritech Offers Online Bond Info", (PublicFinance.com Enables Local Governments Tor Provide Bond Information Online (Company Business and Marketing), located at https://www.thedacs.com/techs/abstractl75495, 6 pages, retrieved Nov. 4, 2008.
"U.S. Appl. No. 11/339,223", Final Office Action dated Jun. 25, 2008.
"U.S. Appl. No. 11/339,223", Non-Final Office Action dated Jan. 8, 2009.
"U.S. Appl. No. 11/339,223", Non-Final Office Action dated Dec. 26, 2007.

(Continued)

*Primary Examiner* — Brian Whipple
(74) *Attorney, Agent, or Firm* — Hubbs, Enatsky & Inoue PLLC

(57) ABSTRACT

An extranet includes a network which couples a plurality of non-related participants and a server coupled to the network. The server stores a plurality of applications including workgroup applicants, transaction applications, security applications and transport circuits and equipment. The server is programmed to load particular ones of the plurality of applications onto the network for use by the plurality of participants in response to a request by one of the participants for a particular application.

20 Claims, 5 Drawing Sheets

(56) References Cited

U.S. PATENT DOCUMENTS

| | | | |
|---|---|---|---|
| 6,185,551 | B1 | 2/2001 | Birrell |
| 6,199,204 | B1 | 3/2001 | Donohue |
| 6,205,147 | B1 | 3/2001 | Mayo |
| 6,212,549 | B1 | 4/2001 | Page |
| 6,223,177 | B1 | 4/2001 | Tatham |
| 6,226,748 | B1 | 5/2001 | Bots |
| 6,226,751 | B1 | 5/2001 | Arrow |
| 6,237,020 | B1 | 5/2001 | Leymann |
| 6,282,709 | B1 | 8/2001 | Reha |
| 6,289,511 | B1 | 9/2001 | Hubinette |
| 6,353,926 | B1 | 3/2002 | Parthesarathy |
| 6,378,069 | B1 | 4/2002 | Sandler |
| 6,442,692 | B1* | 8/2002 | Zilberman ............ G06F 21/316 |
| | | | 713/184 |
| 6,453,348 | B1 | 9/2002 | Barnier |
| 6,526,456 | B1 | 2/2003 | Allan |
| 6,692,359 | B1 | 2/2004 | Williams |
| 6,697,861 | B2 | 2/2004 | Barnier |
| 6,985,941 | B2 | 1/2006 | Schweitzer et al. |
| 7,139,983 | B2 | 11/2006 | Kelts |
| 7,308,701 | B1 | 12/2007 | Kinder |
| 2002/0013841 | A1 | 1/2002 | Schweitzer et al. |
| 2002/0013842 | A1 | 1/2002 | Schweitzer et al. |
| 2002/0013843 | A1 | 1/2002 | Schweitzer et al. |
| 2002/0069218 | A1 | 6/2002 | Sull |
| 2002/0091811 | A1 | 7/2002 | Schweitzer et al. |
| 2002/0108127 | A1 | 8/2002 | Lew |
| 2002/0118950 | A1 | 8/2002 | Molinet |
| 2002/0120573 | A1* | 8/2002 | McCormick ........... G06Q 50/22 |
| | | | 705/50 |
| 2002/0166123 | A1 | 11/2002 | Schrader |
| 2002/0167522 | A1 | 11/2002 | Miyazawa |
| 2002/0184195 | A1 | 12/2002 | Qian |
| 2003/0061206 | A1 | 3/2003 | Qian |
| 2003/0085997 | A1 | 5/2003 | Takagi |
| 2003/0093790 | A1 | 5/2003 | Logan |
| 2003/0093792 | A1 | 5/2003 | Labeeb |
| 2003/0097331 | A1* | 5/2003 | Cohen .................... G06Q 20/10 |
| | | | 705/39 |
| 2003/0130979 | A1 | 7/2003 | Matz |
| 2003/0182567 | A1 | 9/2003 | Barton |
| 2003/0208626 | A1 | 11/2003 | Gibbon |
| 2003/0220100 | A1 | 11/2003 | McElhatten |
| 2004/0034869 | A1 | 2/2004 | Wallace |
| 2004/0177370 | A1 | 9/2004 | Dudkiewicz |
| 2004/0220926 | A1 | 11/2004 | Lamkin |
| 2005/0044561 | A1 | 2/2005 | McDonald |
| 2005/0132398 | A1 | 6/2005 | Baran |
| 2005/0144635 | A1 | 6/2005 | Boortz |
| 2006/0048191 | A1 | 3/2006 | Xiong |
| 2006/0101504 | A1 | 5/2006 | Aravamudan |
| 2006/0218183 | A1 | 9/2006 | Ivey |
| 2006/0225097 | A1 | 10/2006 | Lawrence-Apfelbaum |
| 2007/0136777 | A1 | 6/2007 | Hasek |
| 2007/0162502 | A1 | 7/2007 | Thomas |
| 2007/0174276 | A1 | 7/2007 | Sullivan |
| 2007/0186247 | A1 | 8/2007 | White |
| 2008/0112690 | A1 | 5/2008 | Shahraray |
| 2016/0189118 | A2* | 6/2016 | Cohen .................... G06Q 20/10 |
| | | | 705/41 |

OTHER PUBLICATIONS

"U.S. Appl. No. 11/339,223", Response filed Mar. 26, 2008 to Non-Final Office Action dated Dec. 26, 2007.
"U.S. Appl. No. 11/339,223", Response filed Apr. 16, 2009 to Non Final Office Action dated Jan. 8, 2009.
"U.S. Appl. No. 11/339,223", Response filed Oct. 27, 2008 to Final Office Action dated Jun. 25, 2008.
"U.S. Appl. No. 11/351,150", Final Office Action dated Mar. 16, 2009.
"U.S. Appl. No. 11/351,150", Non-Final Office Action dated Mar. 3, 2008.
"U.S. Appl. No. 11/351,150", Non-Final Office Action dated Sep. 5, 2008.
"U.S. Appl. No. 11/351,150", Response filed Dec. 4, 2008 to Non-Final Office Action dated Sep. 5, 2008.
"U.S. Appl. No. 11/351,150", Response filed Apr. 30, 2009 to Final Office Action dated Mar. 16, 2009.
"U.S. Appl. No. 11/351,150", Response filed Jun. 2, 2008 to Non Final Office Action dated Mar. 3, 2008.
"U.S. Appl. No. 11/595,351", Non-Final Office Action dated Jan. 21, 2009.
"AT&T Intranet/Extranet Service", located at http://www.att.net.hk/products/intranet extranet.html, 2 pages, retrieved on Dec. 4, 1997.
"getAccess Data Sheet", located at http:/ /www.encommerce.com/Qublic/Qroducts/docs/gads/resource. html, 1 page, retrieved Aug. 26, 1997.
"getAccess Fact Sheet", How Get Access Works, located at http://www.encommerce.com/Qublic/Qroducts/docs/getaccess/getaccess2.html, 3 pages retrieved Aug. 26, 1997.
"getAccess Fact Sheet, Integrated Environment for User Access and Resource Deployment on the Extranet", http://www.encommerce.com/Qublic/Qroducts/docs/getaccess/getaccess.html, 3 pages, retrieved Aug. 26, 1997.
"Harbinger Overview", http://ww.harbinger.com/infoloverview.htm, 7 pages, retrieved on Apr. 6, 1998.
"International Application Serial No. PCT/US07/01816", International Search Report dated Feb. 14, 2008.
"International Application Serial No. PCT/US07/01816, International Search Report dated Feb. 14, 2008", 4 pgs.
"International Application Serial No. PCT/US2007/001816", Preliminary Report on Patentability dated Aug. 7, 2008.
"International Application Serial No. PCT/US2007/083132", International Search Report dated Apr. 15, 2008.
"International Application Serial No. PCT/US2007/083132", Written Opinion dated Apr. 15, 2008.
"Intranet to Extranet", http://www.tw2.com/extra.html, 1 page, retrieved on Dec. 4, 1997.
"Open Text Offers Livelink as a Subscription Service", http://newswire.ca/releases/Januarv1998/12/c2081.html, 1 page, retrieved on Apr. 6, 1998.
"Oracle Applications", http://www.oracle.com/groducts/al2l2lications, 2 pages, retrieved on Apr. 6, 1998.
"Overview of Extranet Standards, Extending the Networked Enterprise", http://home.netscaQe.com/comQrod/at work/whiteQaQer/extranetstds.html, 5 pages, retrieved on Aug. 26, 1997.
"The Rise of the Extranet, Linking Business Partners Via Internet Technology", http://octodav.com/editorial/aoinonline/970235a.html, 2 pages, retrieved on Dec. 4, 1997.
"What Is . . . extranet (a definition)", http://whatis.com/extranet.htm, 1 page, retrieved Aug. 26, 1997.
"What Is . . . intranet (a definition)", http://whatis.com/intranet.htm, 1 page, retrieved Dec. 4, 1997.
"White Paper—Lotus's Internet Applications: Bringing Extensible Business Solutions to the 'Net", http://www.lotus.com/corocomm/3582.htm, 6 pages, retrieved Aug. 27, 1997.
"White Paper—Notes and Transaction System: mQSeries and CICS Link for Lotus Notes", Integrating Transaction and Client/Server Systems, located at http://www.lotus.com/corocomm/2596.htm, 6 pages, retrieved Aug. 27, 1997.
Adlai-Gail, "Opinion and Outlook: Extra! Extra! Now's the Time to Build an Extranet, It's a Win-Win Tool in Line for Explosive Growth", http://www.otcg.com/html/body build an extranet.html, 2 pages, retrieved on Dec. 4, 1997.
Andreesen, "The Networked Enterprise: Netscape Enterprise Vision and Product", http://home.netscal2e.com/coml2rod/at work/white l2al2er/vision/intro.html, 5 pages, retrieved Aug. 27, 1997.
Bhardwaj, "Re; VPN, Extranet, Internet", http://www.innergy.com/ix/arc/886.html, 1 page, retrieved Dec. 4, 1997.
Dimitrova, "Applications of Video-Content Analysis and Retrieval", IEEE Multimedia, IEEE Service Center, New York, NY, US, vol. 9, No. 3, Jul. 2002 (Jul. 2002), (Jul. 2002), 42-55.
Fitzloff, "Ameritech Expands EBX Extranet Offerings", InfoWorld, vol. 19, Issue 42, Oct. 20, 1997, 2 pages.

(56) References Cited

OTHER PUBLICATIONS

Highleyman, "OL TP Middleware Integrates Client and Server Applications", http://www.xstar.comcarnt/info/olto.html, 4 pages, retrieved Aug. 27, 1997.

Jilovec, "The Role of EDI in Extranets", http://www.midrangesystems.com/Archive/1997/oct1 0/ji101 016.htm, 2 pages, retrieved on Dec. 4, 1997.

Netminute #405, "Intranet, Internet, Extranet", http://www.netminute.com/NM100405.htm, retrieved on Dec. 4, 1997.

Onesoft Corporation, "The Extranet Solution, The Business Software Application for the 21st Century", Extranet Components, located at http://www.gxinet.com/scriQtsllAS.DLL ?SubSystemID=1&ComQonentID=265, 4 pages, retrieved Aug. 26, 1997.

Onesoft Corporation, "The Extranet Solution, The Business Software Application for the 21st Century", Sample Extranet Scenarios, located at http://lwww.gxinet.com/scriQtsllAS.DLL ?SubSystemID=1&ComQonentID=263, 5 pages, retrieved Aug. 26, 1997.

Onesoft Corporation, "The Extranet Solution, The Business Software Application for the 21st Century, Introduction: The Third Wave of Internet Evolution", http://www.gxinet.com/scril2ts/IAS.DLL ?SubS~stemID=1 &Coml2onentID=260, 2 pages, retrieved Aug. 26, 1997.

Onesoft Corporation, "The Extranet Solution, The Business Software Application for the 21st Century, The Extranet", http://www.gxinet.com/scril2ts/IAS.DLL ?SubS~stemID=1&Coml2onentID=261, 1 page, retrieved Aug. 26, 1997.

Qian, "Multimedia Search and Retrieval: New Concepts, System Implementation and Application", IEEE Transactions on Circuits and Systems for Video Technology, IEEE Service Center, Piscataway, NJ, US, vol. 1 0, No. 5, Aug. 2000(Aug. 2000}, (Aug. 2000), 679-692.

Reisman, "Extranets and lntergroupware, A convergence for the next generation in electronic media-based activity", http://www.teleshuttle.com/medialInterGW.html, 4 pages, retrieved on Aug. 26, 1997.

Reisman, "Extranets and Intergroupware: A convergence for the next generation in electronic", http://www.teleshuttle.com/media/IngerGW.htm, 4 pages, retrieved Aug. 26, 1997.

Reisman, "What's an extranet? and other key terms", http://www.teleshuttle.com/media/extradef, 1 pages, retrieved Aug. 27, 1997.

Tebbe, "Extranets intelligently link intranets", http://www8.zzzdnet.com/Qcweek/oQinion/1111/11 neteff.html, 1 page, Nov. 11, 1996.

Vitro Crop, "Chooses Open Text's Livelink Intranet to Improve Systems Engineering Document Management", http://www.newswire.ca/releases/March1997/26/c5800.html, 2 pages, retrieved on Apr. 6, 1998.

* cited by examiner

WELCOME <SUBSCRIBER'S NAME>
SELECT THE APPLICATION YOU NEED FOR INSTANT PRODUCTIVITY:

20  E-MAIL: TALK TO YOUR PARTNERS THROUGH YOUR MAIL BROWSER

22  FILE TRANSFER SERVER: SHARE FILES WITH PARTNERS NEAR AND FAR.

24  LIST SERVER: GET YOUR MESSAGE OUT FAST AND EASY

26  PARTNER DIRECTORY: WHO'S WHO IN YOUR VIRTUAL COMMUNITY

28  JAVA-BASED OFFICE SOFTWARE: RUN ANYWHERE WORD PROCESSOR, SPREADSHEET, PRESENTATIONS, DATABASE, CONTACT MANAGER, AND FLOW CHARTS 30  COLLABORATION SUITE: CUT CYCLE TIME WITH PROJECT MANAGEMENT, DISCUSSION GROUPS, WORK FLOW TRACKING, DOCUMENT AND IMAGE LIBRARY, AND BULLETIN BOARDS 32  ELECTRONIC DATA INTERCHANGE: SELL IT SIMPLY THROUGH INTERACTIVE FORMS 34  JAVA APPLET VAULT: GET APPLET POWER + FLEXIBILITY WITH SECURITY.

36  INTERACTIVE COMMERCE ENGINE: SEAMLESS INTERFACE TO LEGACY SYSTEM DATABASES

FIG. 2

WEB BASED EXTRANET ARCHITECTURE PROVIDING APPLICATIONS TO NON-RELATED SUBSCRIBERS

CROSS-REFERENCE TO RELATED APPLICATIONS

This application is a continuation of and claims priority to U.S. Patent application Ser. No. 14/049,361, filed Oct. 9, 2013, which is a continuation of U.S. patent application Ser. No. 13/294,484 filed Nov. 11, 2011, now U.S. Pat. No. 8,566,398, which is a continuation of and claims priority to U.S. patent application Ser. No. 10/744,961 filed Dec. 23, 2003, now U.S. Pat. No. 8,082,300, which is a continuation of and claims priority to U.S. patent application Ser. No. 10/246,430 filed on Sep. 17, 2002, now U.S. Pat. No. 6,697,861, which is a continuation of and claims priority to U.S. patent application Ser. No. 09/187,556 filed on Nov. 6, 1998, now U.S. Pat. No. 6,453,348. The contents of each of the foregoing are hereby incorporated by reference into this application as if set forth herein in full.

FIELD OF THE DISCLOSURE

The present invention is directed to an extra net architecture, and more particularly, to an extra net architecture utilizing Web based technology that provides a large variety of applications to non-related subscribers.

BACKGROUND OF THE DISCLOSURE

Various forms of intranets have provided companies with intraoffice communications for some time. An intranet may be defined as a private application of the same internetworking technology, software and applications within a private network for use within an organization. It may be entirely disconnected from the public Internet or it may be linked to it and protected from unauthorized access by security systems. Such known networks are commonly called "intraoffice" networks because they only allow communications within an organization.

Other networks, often referred to as "extranets" or private internets allow communications and application sharing between designated, non-related organizations. Extranets are generally closed networks that allow communications between designated parties. Various types of "extranet" architectures are known. One type of extranet architecture is often referred to as a shared private network where the organizations that have access to the network are enumerated and often a third party is in charge of updating the list of enumerated users and managing passwords. One such type of shared private network between two organizations, for example, a shipping dock and receiving dock, may be linked to exchange information regarding orders. This is generally the oldest type of extranet. Such extranets have also been used for electronic data interchange (EDI) and involve coupling two organizations through a third party provider using typically XO.25 protocols and not necessarily using Internet Protocols ("IP"). This type of extranet architecture has certain disadvantages. For one, the connection is for a specific purpose and thus has very limited application. Second, only a limited number of an organization's business partners have reason to connect in this manner Third, typically lower data communications and lack of IP capabilities limit the general usefulness of such configurations.

Another type of extranet architecture couples a plurality of nonrelated organizations together with appropriate routing and traffic management capabilities. The organizations may communicate with one another and share various applications. Some implementations are managed by one business partner. This obviously has the drawback that such a system is expensive to implement and particularly burdensome for one party to maintain. While cost-sharing arrangements may be created, one part must still consume the same organizational resources needed to maintain a network for others. While these types of extranets provide good security, they lack the bandwidth to accommodate a large number of applications. Other types of extranets utilize the Internet which provides increased bandwidth but lacks the security of shared private networks. One such type of network which couples organizations through the Internet is referred to as a virtual private network. The variety of virtual private network extranet utilizes facilities of one or more Internet service providers combined with the user's own VPN software instead of setting up a dedicated private network. In order to maintain a level of security, communications over the Internet must be encrypted. A main difference between a virtual private network extranet and the Internet, in general, is that for a virtual private network extranet access is encrypted and limited to designated organizations and/or individuals rather than the world at large. Of course in selecting a particular extranet architecture, the benefits in cost savings must be weighed against security risks.

It is thus desirable to provide an extranet architecture coupled to a wide diversity of applications that may be shared by non-related organizations while eliminating the need for any one organization to maintain the available applications. It is also desirable to provide an extranet architecture that provides an appropriate degree of security and privacy. It is furthermore desirable to provide an extranet architecture that is flexible and can be easily modified and updated.

BRIEF SUMMARY

According to a first aspect of the embodiments, there is provided a method for providing an extranet service between at least two subscribers. The method includes the steps of: interconnecting the plurality of subscribers by digital data circuits to form an extranet; coupling a server to the extranet wherein the server stores a plurality of applications and data including collaboration software, office productivity software, and electronic data interchange software; loading at least one of the plurality of applications onto the extranet for use by the plurality of subscribers in response to a request by a subscriber for a particular application.

According to a second aspect of the embodiments, there is provided a method for providing an extranet service between subscribers. The method includes the steps of: (a) establishing a subscriber database listing customers who subscribe to the extranet service; (b) establishing a communication link between the subscribers listed in the subscriber database to form an extranet; (c) providing collaboration software applications on the extranet; (d) providing workflow software applications on the extranet; (e) providing transaction software applications on the extra net; (f) providing electronic mail software applications on the extra net; (g) providing electronic data interchange software applications on the extranet; (h) sharing the software application provided in steps (b)-(g) among the subscribers listed in the subscriber database.

According to a third aspect of the embodiments, there is provided a method for providing an extranet service between customers, the method comprising the steps of: (a) establishing a communication link between customers to form an extra net; (b) providing workgroup software on the extra net; (c) providing transaction software on the extra net; (d) providing security software on the extranet; (e) providing transport software; (f) sharing the software provided in steps (b)-(e) to the customers on the extranet.

According to a fourth aspect of the embodiments, there is provided an extranet including a network coupling a plurality of non-related participants wherein each participant is located remotely from the other participants, and a server coupled to the network, the server storing a plurality of applications including workgroup applications, transaction applications, security applications and transport applications wherein the server is programmed to load particular ones of the plurality of applications onto the network for use by the plurality of participants in response to a request by one of the plurality of participants.

BRIEF DESCRIPTION OF THE DRAWINGS

FIG. 2 is an example of a screen menu that can be displayed on a subscriber's display.

DETAILED DESCRIPTION OF THE DRAWINGS

Figure 1:
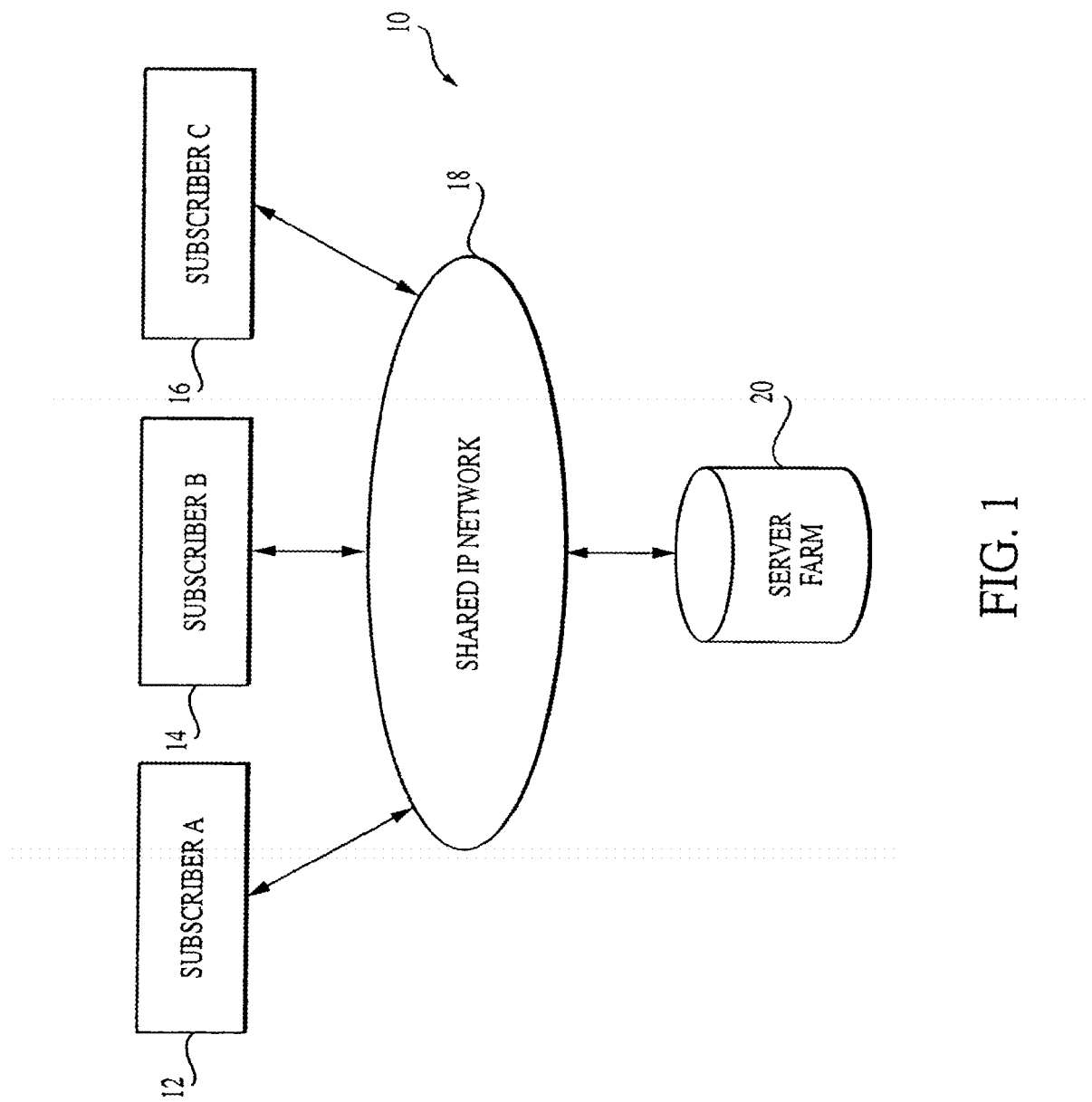
FIG. 1 is a schematic illustration of an extranet architecture according to a preferred embodiment of the present invention.

FIG. 1 is a schematic illustration of an extranet architecture according to a preferred embodiment of the present invention. The architecture 10 includes generally a plurality of subscribers 12, 14, 16; a shared network 18 utilizing Internet Protocol ("IP"), and a server farm 20. As shown, the shared network 18 couples the plurality of subscribers to the server farm 20. While the various components will be described in detail hereinafter, in general the server farm 20 is an interconnected grouping of storage devices that stores a multitude of applications and databases, for example, on redundant disks as will be described hereinafter.

In general, the subscribers are non-related entities, for example, different companies and/or organizations, or individuals. A subscriber on the shared network 18 may have access to some or all of the applications and data available on the server farm 20 through their network connection. Access for an individual user would be determined by what applications the user or user's organization has subscribed to; the access granted to data and applications granted by the user's organization; and the access granted to particular data files by owners of those files. This could mean access to a server-based application through a client's browser or distributing, updating and connecting a client/server application. In a preferred embodiment, Web browser technology is used to present each subscriber with a menu of applications from which they may choose merely by clicking on a particular icon displayed on a display unit (not shown).

Shown in FIG. 2 is an example of a screen menu that can be displayed on a display of a subscriber's computer, for example. Illustrated are various menu icons that represent applications available to the subscriber from which the subscriber can select merely by clicking on a menu icon. The selection of applications is intended to be illustrative and not limiting. It will be appreciated that future upgrades may replace or eliminate applications illustrated while adding new ones. For example, icon represents an electronic mail application which allows subscribers to communicate with one another over the extranet. Icon 22 represents a file transfer server application that allows subscribers to share files over the extranet. Icon 24 represents a list server application that allows subscribers to create address groups so that electronic messages can be created simply and efficiently. Icon 26 represents a partner directory that lists subscribers on the extranet. Icon 28 represents Java-based office applications which provide word processor, spreadsheet, presentations, database applications. Icon 32 represents a collaboration suite application which includes project management, discussion groups, work flow engine, document and image library and bulletin board applications. Icon 34 represents an electronic data interchange (EDI) application. This would enable low-volume EDI users to enter transactions into a Web page or enable medium-volume users to send transactions by secure EDI-MIME type e-mail. Icon 36 represents a Java applet vault application to provide, store and verify digital certificates for Java applets shared by subscribers. Of course more applications may be added to the server farm. While FIG. 2 illustrates particular applications, a subscriber's access to certain applications may be limited and not all of the subscribers may have access to all of the applications based on the user's security profile.

Figure 3:
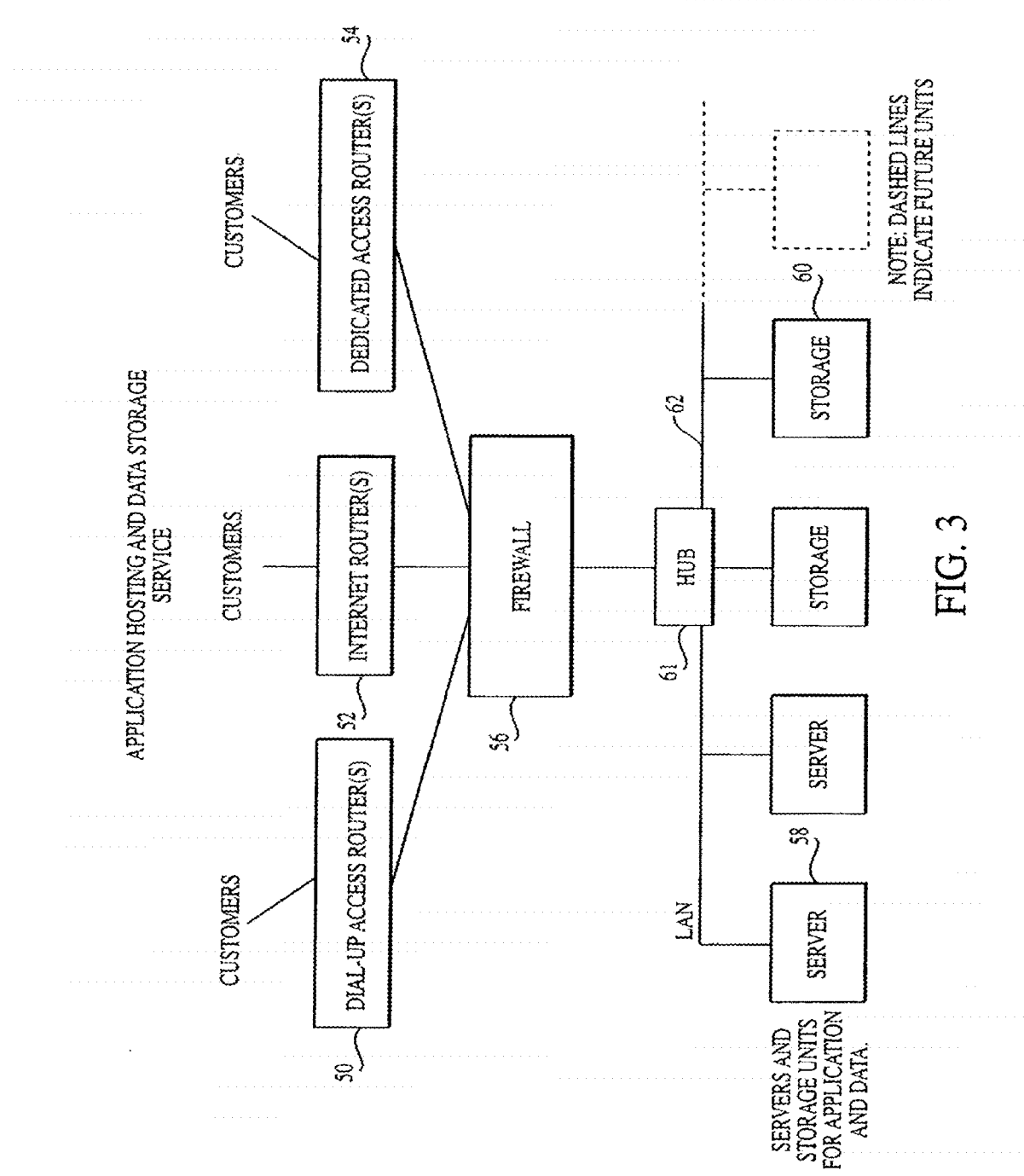
FIG. 3 is a more detailed schematic block diagram of the extranet architecture shown in FIG. 1 according to a preferred embodiment of the present invention.

FIG. 3 is a more detailed schematic block diagram of the extranet architecture shown in FIG. 1 according to a preferred embodiment of the present invention. Three subscribers 12, 14 and 16 are illustrated, but, of course there may be more or less. In addition, the term "subscriber" is used to refer to non-related entities, i.e., two companies, for example. Each subscriber may have its own intranet coupling various of its organizations, for example, in the form of a local area network although the present invention is not limited to subscribers having local area networks and individuals having a workstation may also be subscribers. While only three subscribers are shown it will be appreciated that many more subscribers can be coupled together with the extranet architecture according to the present invention. The shared network 18 includes various routers, and more particularly, dial-up access routers 50, Internet access routers 52 and dedicated access routers 54 that provide the subscribers with various options for accessing the shared network 18 as will be described in greater detail hereinafter.

Security may be provided in various ways such as by what is commonly referred to as a firewall 56, one time passwords, encryption programs, digital certificates and user application security, for example. Various combinations of these security features may be used. In a preferred embodiment, these security approaches would be layered to provide a highly secure environment in which subscribers can share ideas and information. Encrypting may be accomplished by the use of virtual private networking technology or other technologies that evolve. In addition, security can be administered at the network, application, application module and user file levels to continually update needed profile information. The server farm 20 includes at least one application server 58 and a plurality of storage units 60 coupled together and to the firewall 56 by a hub 61 and local area network 62, for example. The number of storage units 60 will of course depend upon the number of applications provided and amount of user data stored on the server farm 20.

Figure 4:
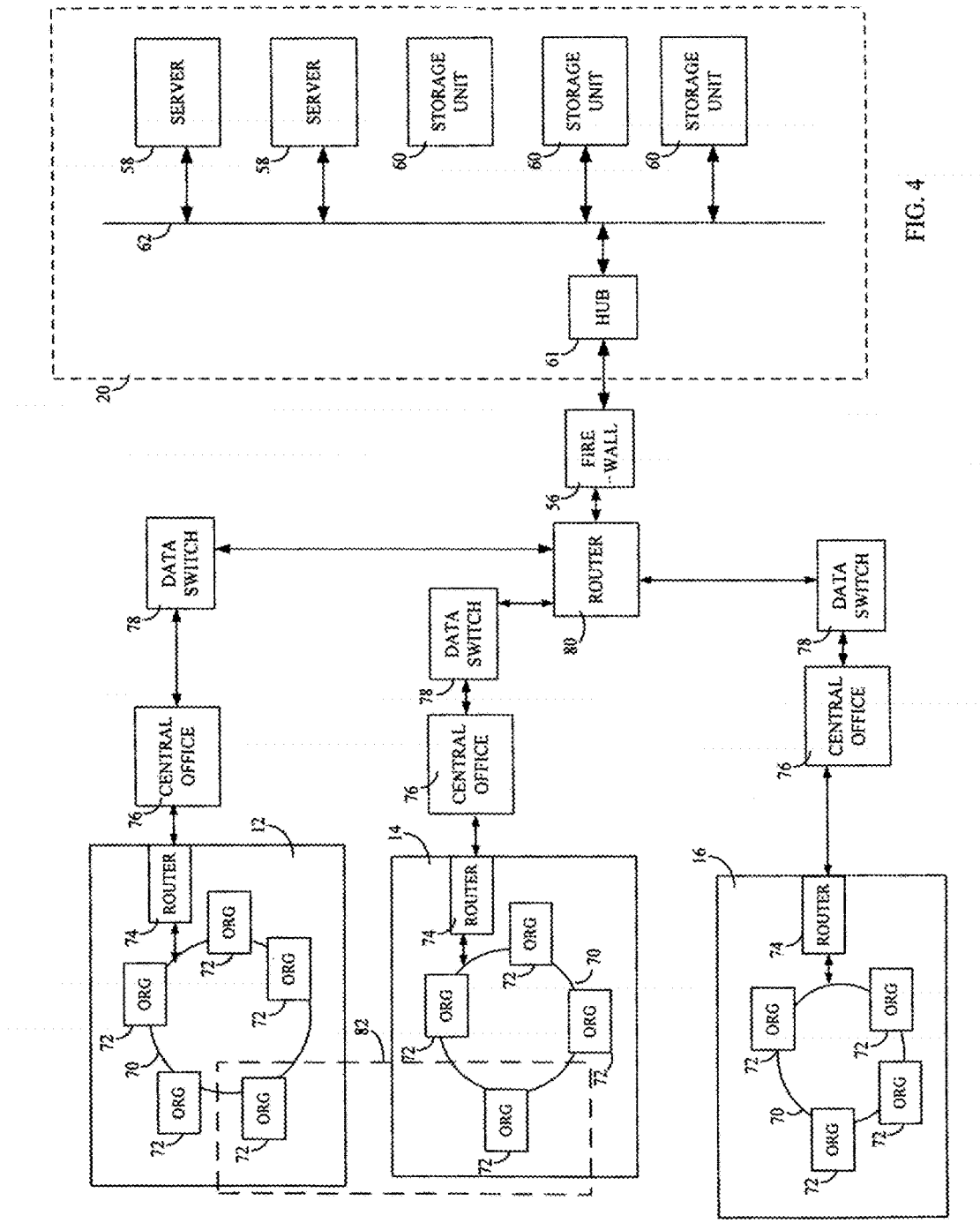
FIG. 4 is a still more detailed schematic block diagram of the extranet architecture shown in FIG. 1 according to a preferred embodiment of the present invention.

FIG. 4 is an even more detailed schematic block diagram of the extranet architecture shown in FIG. 1 according to a preferred embodiment of the present invention. Shown in FIG. 4 are subscribers 12, 14 and 16. Each subscriber may have its own intranet architecture 70 coupling its various organizations 72 which can be located at various geographic sites to one another. Alternatively, a subscriber may be one individual located at a standalone work station. Each subscriber accesses the extranet architecture through a router 74. As previously mentioned, the subscribers have various options for accessing the extranet architecture according to the present invention including analog or ISDN dial-up access or dedicated access using ATM, SMDS or frame relay protocols. FIG. 4 does not illustrate in detail the architecture for accessing the extranet architecture according to the present invention since those are well known to those of ordinary skill the art. Typically a PSTN central office 76 and a data network provider switch site 78 as well as an additional router 80 couple each subscriber to the firewall 56. In a preferred embodiment an additional router 80 is coupled to the firewall 56 by an Ethernet link. In a preferred embodiment a redundant additional router (not shown) would be provided as a back-up to additional router 80. The server farm 20 includes the hub 61, local area network 62, application servers 58 and storage units 60.

The operation of the extranet will now be described in detail. Various non-related subscribers are coupled to server farm 20 by access routers. The non-related subscribers are able to access applications and data stored by the application servers 58 and storage units 60 although access of some applications and/or data may be restricted based upon security concerns.

The present invention allows non-related entities to collaborate with one another in a simple, flexible manner without requiring any particular subscriber to maintain the integrity or currentness of the extranet. For example, company A may be working with non-related company B on the production of a part and require a logical project extranet 82 to be created between them. By using the extranet according to the present invention, companies A and B may securely exchange email, participants in discussion for a collaboratively work on documentation, spread sheets, workflow schedules, etc Importantly, the communications and data exchanged between companies A and B are secured from access by other subscribers on the extranet. Thus subscribers can flexibly add or delete subscribers on the extranet according to their needs. In addition, each subscriber has access to a large number of applications without having to maintain such applications. Thus, a communication link is established between the subscribers listed in a subscriber database by establishing appropriate routing tables within an established security policy.

Returning to FIG. 2 the various applications illustrated in the menu screen are commercially available products which may be used in the present invention. It will be appreciated that applications will be upgraded and new applications added and older ones deleted as the technology develops. For example, Livelink Intranet available from Open Text Corp of Toronto, Ontario Canada may be used as a collaboration software application. The Express and Trusted Link products from Harbinger Corp. of Atlanta, Ga. may be used for an electronic data interchange application software.

Figure 5:
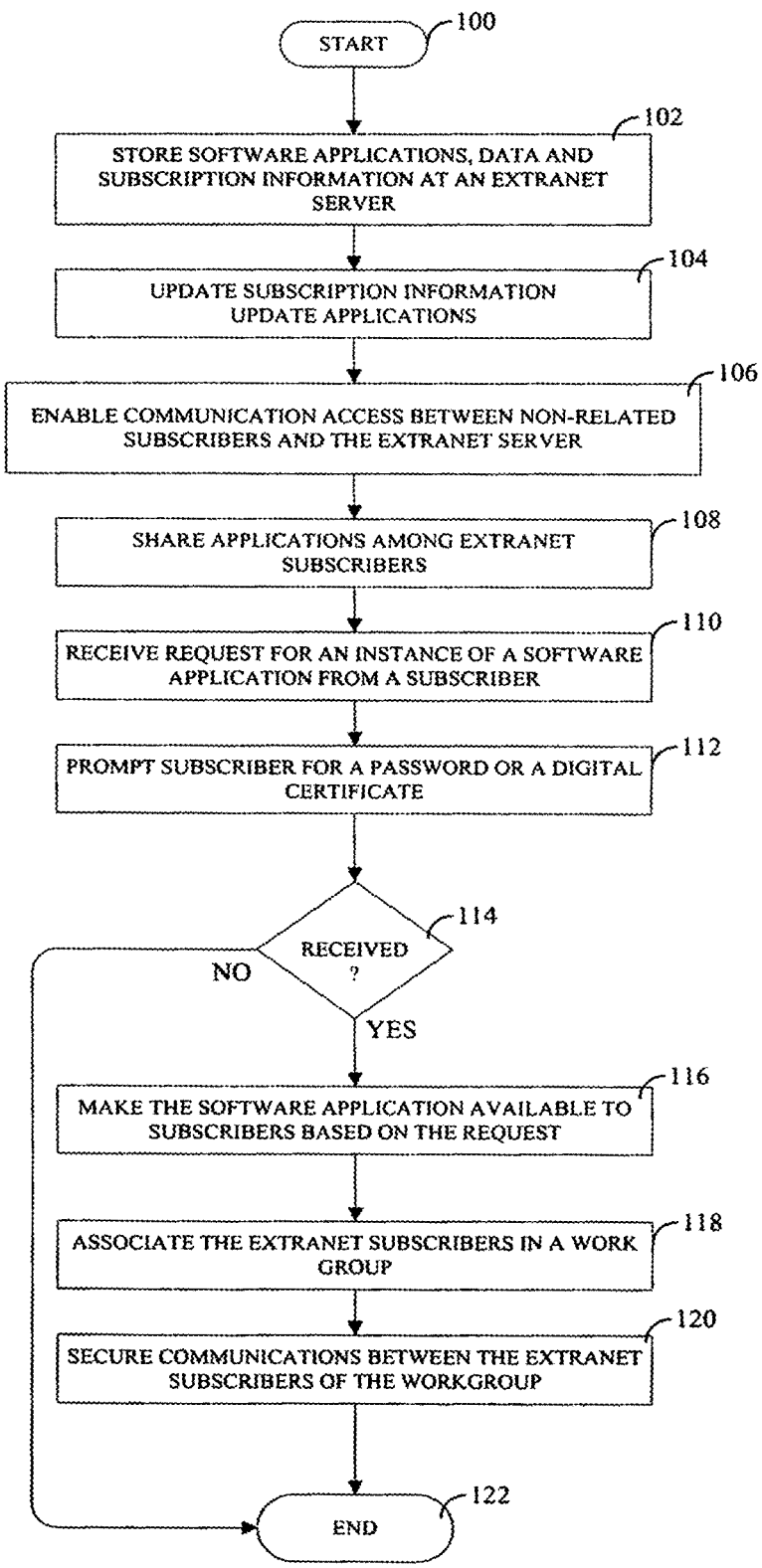
FIG. 5 illustrates an extranet method for providing extranet subscribers with access to software applications.

FIG. 5 illustrates an extranet method for providing extranet subscribers with access to software applications. The method begins at block 100. At block 102, an extranet server stores software applications, data and subscription information for extra net subscribers. At block 104, updates are performed on the stored information, including updating the subscription information and updating the stored applications. At block 106, communication access is enabled between non-related subscribers and the extra net server. At block 108, applications are shared among the extranet subscribers'. At block 110, a request is received from a subscriber for an instance of a software application. At block 112, to ensure security, the subscriber is prompted for a password or a digital certificate. At block 114, if the correct response to the security prompt is not received, the method ends. Otherwise, at block 116, the software application is made available to subscribers based on the request. At block 118, the extranet subscribers are associated in a work group, such as logical project extranet 82 illustrated in FIG. 4. At block 120, communications are secured between the extranet subscribers of the workgroup so that that the communications and data exchanged are not available to other subscribers. The workgroup proceeds in operation and the method ends at block 122.

The foregoing description of the preferred embodiments of the present invention have been presented for purposes of illustration and description. It is not intended to be exhaustive or to limit the invention to the precise form disclosed. Many modifications and variations will be apparent to practitioners skilled in the art.

Furthermore, the preferred embodiments of the present invention would be customer driven in the applications hosted. Therefore, customers could suggest applications to include on the servers. For example, different subscribers using common computer aided design (CAD) software could request the inclusion on the servers of a file library developed by their CAD software vendor.

Similarly, any process steps described might be interchangeable with other steps in order to achieve the same result. The embodiments were chosen and described in order to best explain the principles of the invention and its practical application, thereby enabling others skilled in the art to understand the invention for various embodiments and with various modifications as are suited to the particular use contemplated.

What is claimed is:

1. A device comprising:
   a memory that stores instructions; and
   controller coupled to the memory, wherein responsive to executing the instructions, the controller performs operations comprising:
   establishing communication over the Internet with a server of a group of servers of an extranet;
   providing a password to the server;
   responsive to the password, obtaining via the server, access to a group of selectable icons representing available data of the extranet, wherein the data is available in accordance with subscription information associated with a user of the device;
   providing, to the server, a selection of particular data based on a user selection from the group of selectable icons; and
   accessing, via the server, the particular data.

2. The device of claim 1, wherein the operations further comprise establishing communication via the server with another device of a non-related subscriber on the extranet.

3. The device of claim 2, wherein the operations further comprise exchanging communications with the other device to associate with the other device in a workgroup.

4. The device of claim 3, wherein the communications are secured from access by other subscribers on the extranet not included in the workgroup.

5. The device of claim 1, wherein the group of selectable icons include graphics and text.

6. The device of claim 1, wherein the subscription information comprises a security profile associated with the user of the device, the user being a subscriber on the extranet.

7. The device of claim 1, wherein access to the data is in accordance with the security profile.

8. The device of claim 1, wherein the device establishes communication with the server through a router.

9. The device of claim 1, wherein the device communicates with the server to transmit to service provider equipment of the extranet a suggestion regarding a new application to include on the extranet.

10. A method comprising:
providing, by a system including a group of servers of an extranet, communication access for a subscriber device to the extranet;
receiving, by the system from the subscriber device, a password;
responsive to the password, enabling access by the subscriber device to a group of selectable icons representing available data for display at the subscriber device, wherein the data available to the subscriber device is in accordance with a user profile;
receiving, by the system, from the subscriber device, a selection from the group of selectable icons; and
providing, by the system to the subscriber device, access to particular data according to the selection from the group of selectable icons of available data.

11. The method of claim 10, further comprising providing, by the system, communication access to another device of a non-related subscriber on the extranet; and
enabling, by the system, an exchange of communications between the subscriber device and the other device.

12. The method of claim 11, wherein, in accordance with the exchange of communications, the subscriber device and the other device are associated in a workgroup.

13. The method of claim 12, wherein communications between subscribers in the workgroup are secured from access by other subscribers on the extranet not included in the workgroup.

14. The method of claim 10, wherein the group of selectable, icons include graphics and text.

15. The method of claim 10, wherein the system receives a suggestion regarding a new application to include on the extranet.

16. A computer-readable storage device comprising instructions which, when executed by a processor of a subscriber device communicatively coupled to a server of an extranet, cause the processor to perform operations comprising:
establishing communication with the server;
receiving, from the server, a group of selectable icons of available data of the extranet, wherein the data is available in accordance with a user profile associated with the subscriber device;
providing a selection of particular data according to a selection from the group of selectable icons of available data; and
accessing the particular data.

17. The computer-readable storage device of claim 16, wherein the operations further comprise receiving from the server a prompt to provide a password; and
providing the password.

18. The computer-readable storage device of claim 16, wherein the operations further comprise establishing communication via the server with another device of a non-related subscriber to the extranet; and
exchanging communications with the other device to associate with the other device in a workgroup, wherein the communications are secured from access by other subscribers on the extranet not included in the workgroup.

19. The computer-readable storage device of claim 16, wherein the group of selectable icons include graphics and text.

20. The computer-readable storage device of claim 16, wherein the operations further comprise providing a suggestion to the server regarding a new application to include on the extranet.

* * * * *